Figure 1:
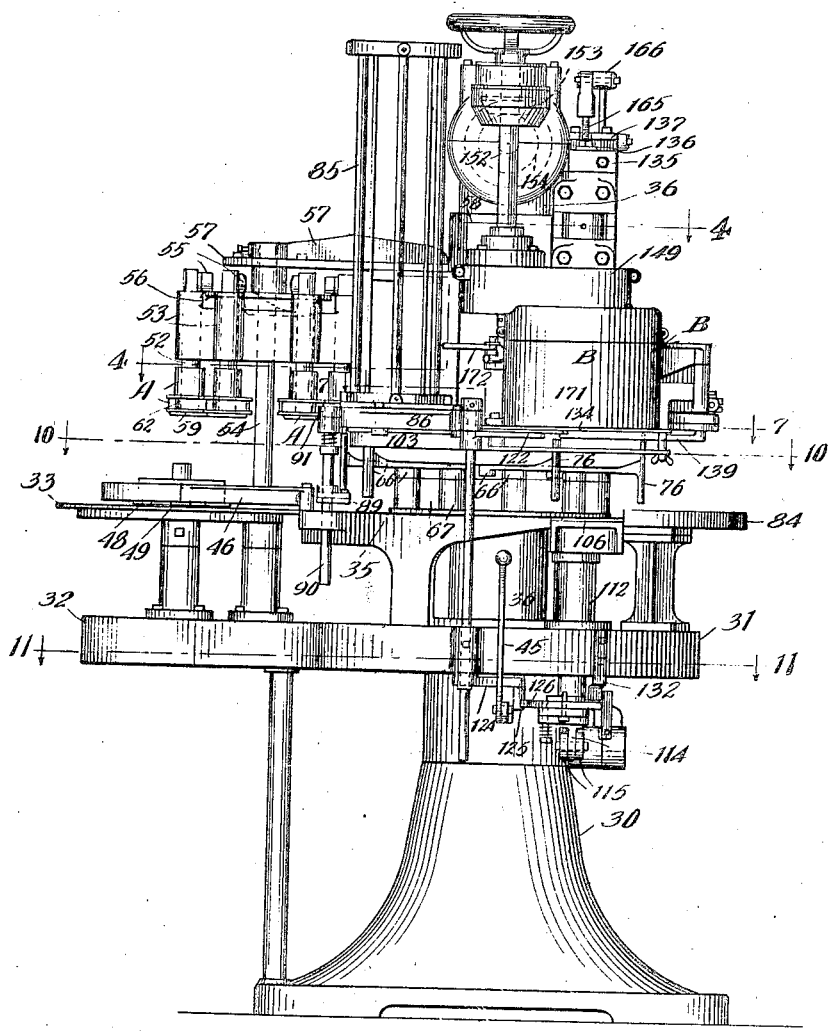

P. W. FLEISCHER.
FILLED CAN CLOSING MACHINE.
APPLICATION FILED NOV. 28, 1913.

1,406,631.

Patented Feb. 14, 1922.
9 SHEETS—SHEET 1.

Witnesses:
Wm Geiger
Joseph Harris

Inventor:
Paul W. Fleischer
By Munday, Evarts, Adcock & Clarke
his Attys

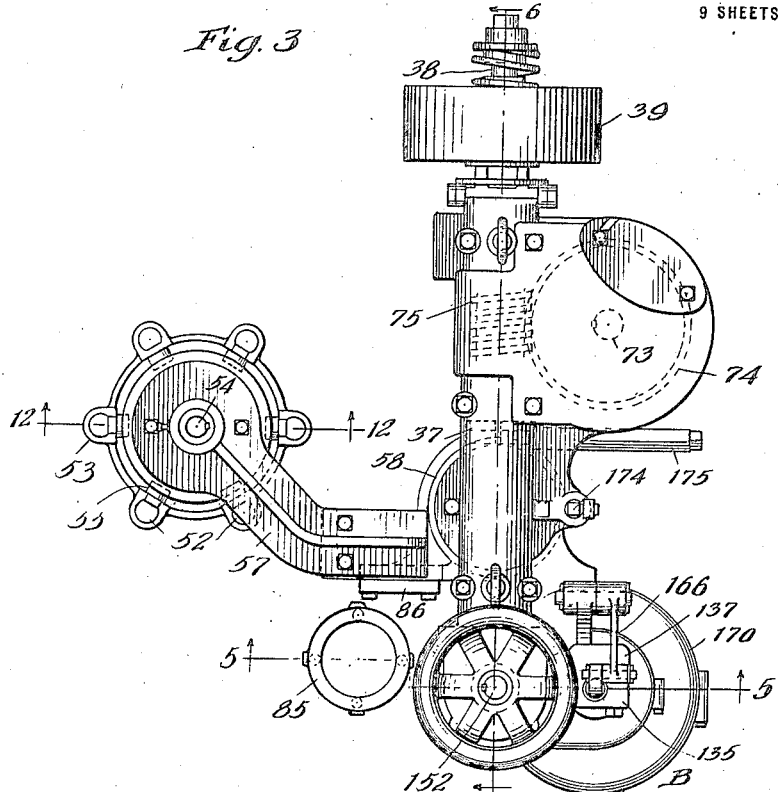
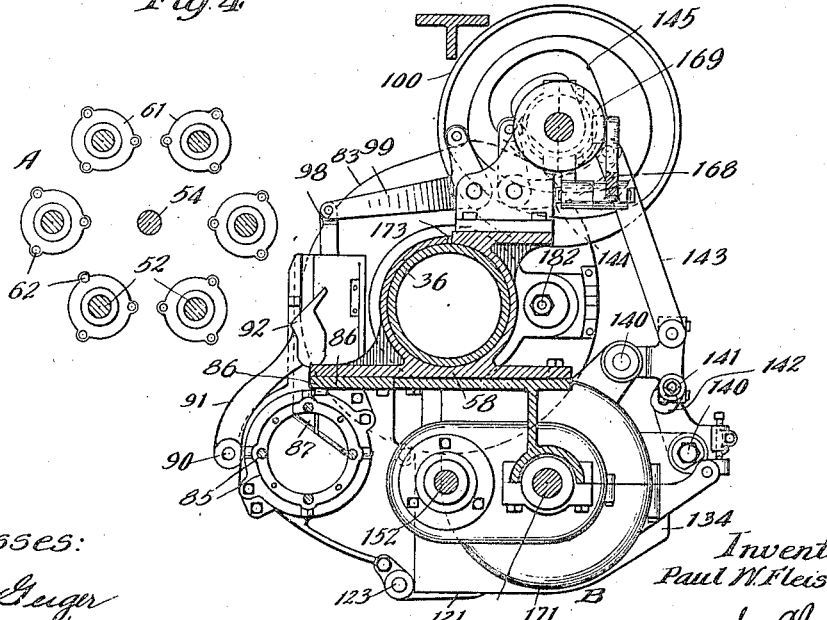

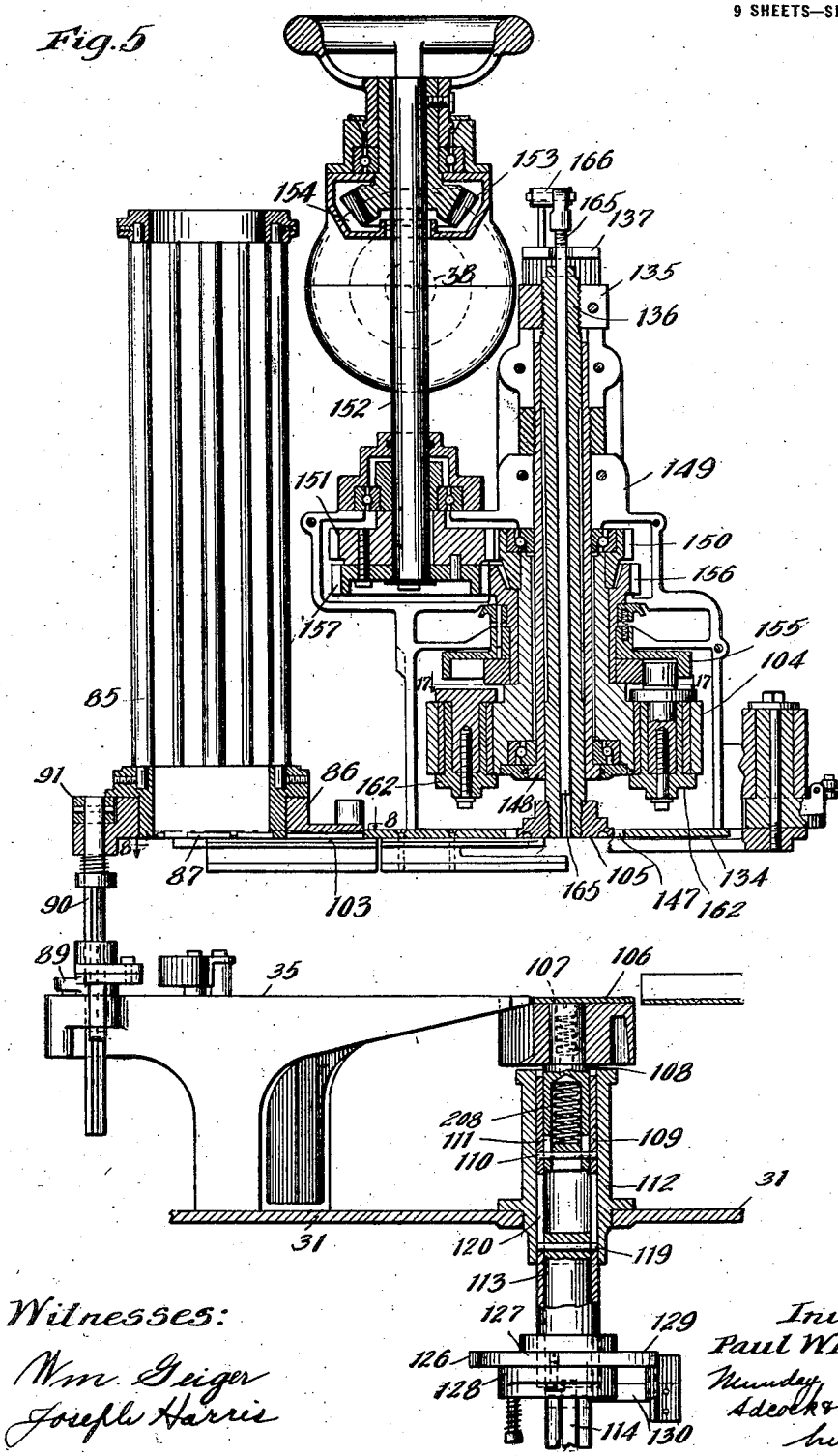

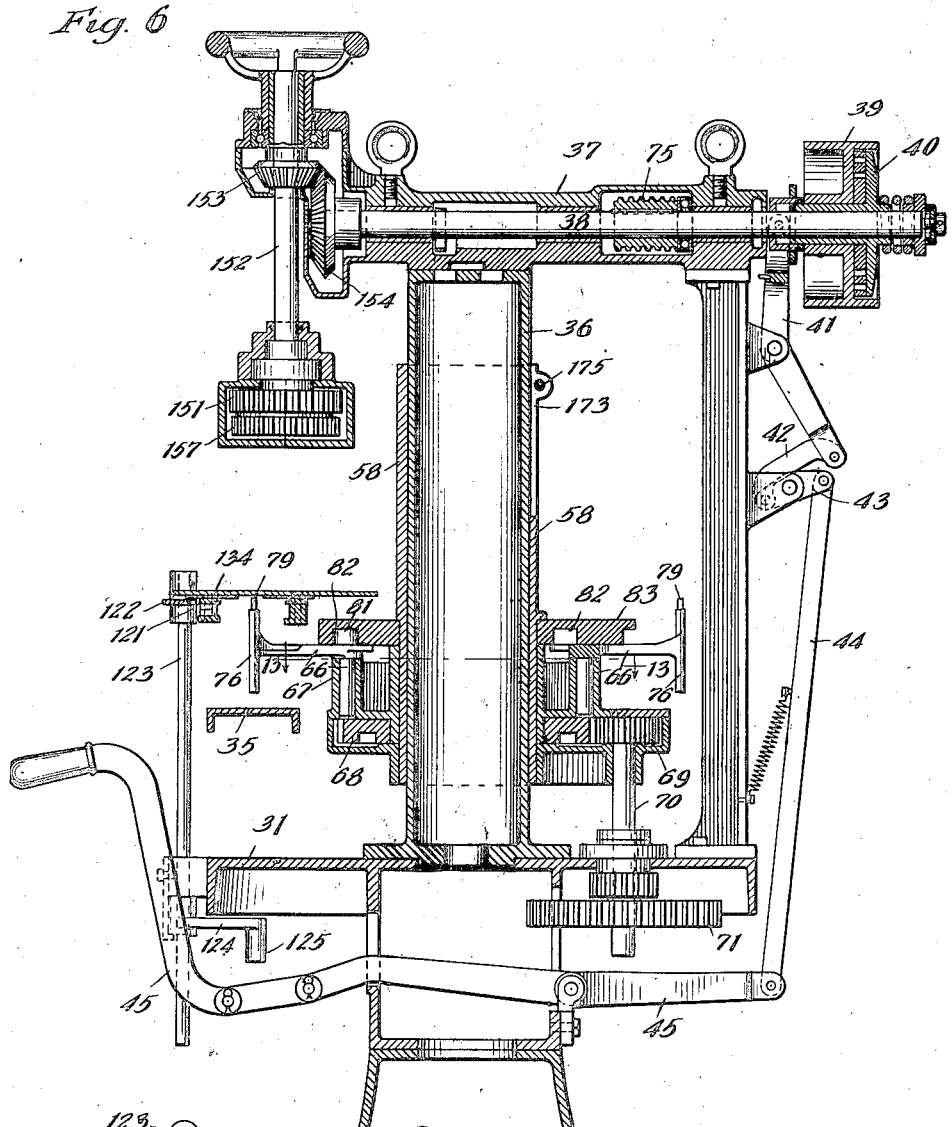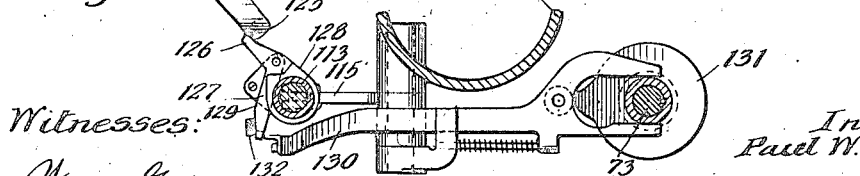

P. W. FLEISCHER.
FILLED CAN CLOSING MACHINE.
APPLICATION FILED NOV. 28, 1913.
1,406,631.
Patented Feb. 14, 1922.
9 SHEETS—SHEET 6.
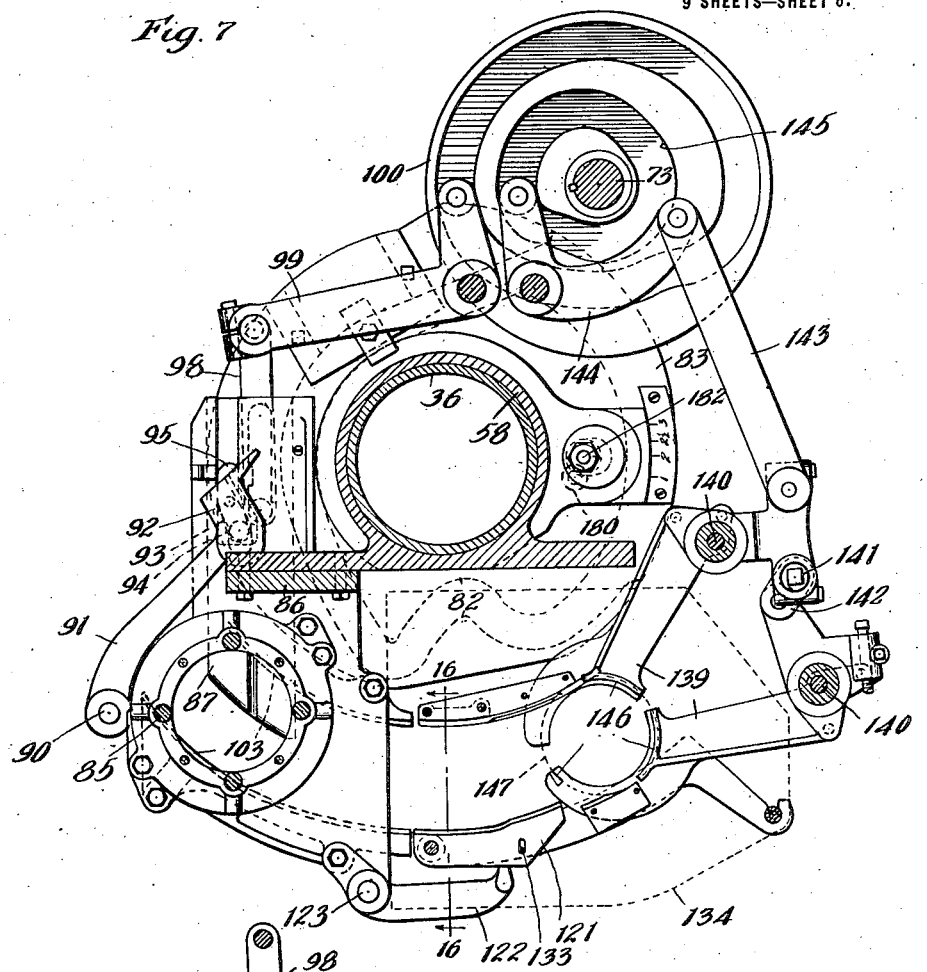
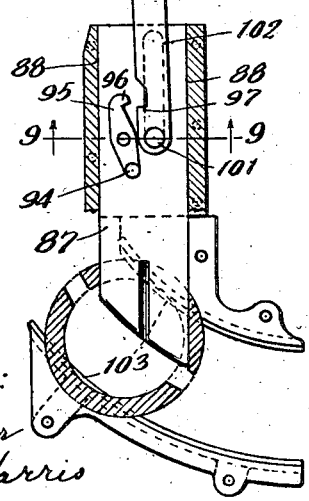
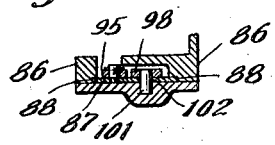
Witnesses:
Wm. Geiger
Joseph Harris
Inventor:
Paul W. Fleischer
By Munday, Evarts, Adcock & Clarke
his Attys

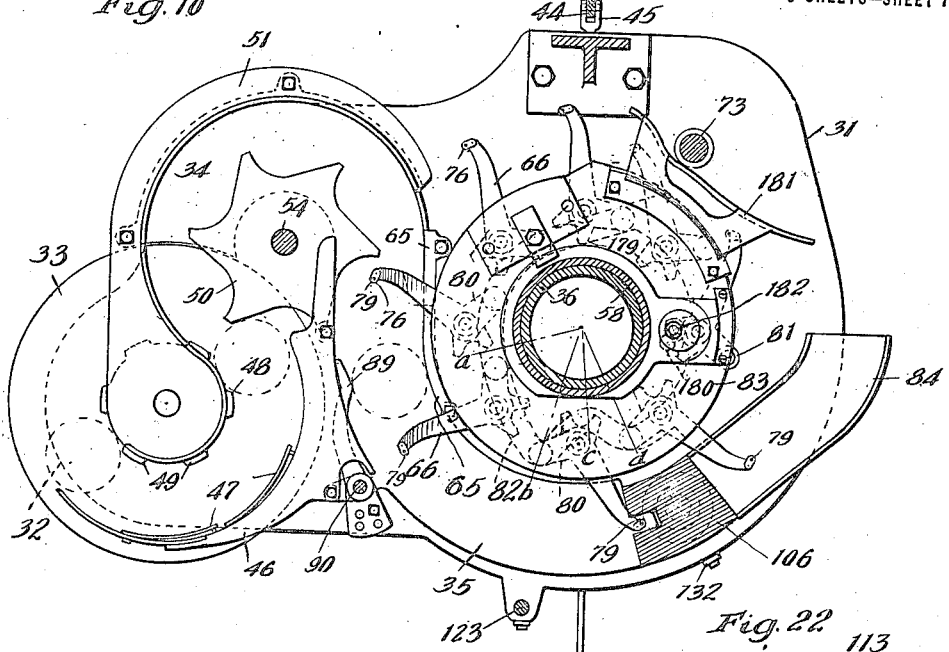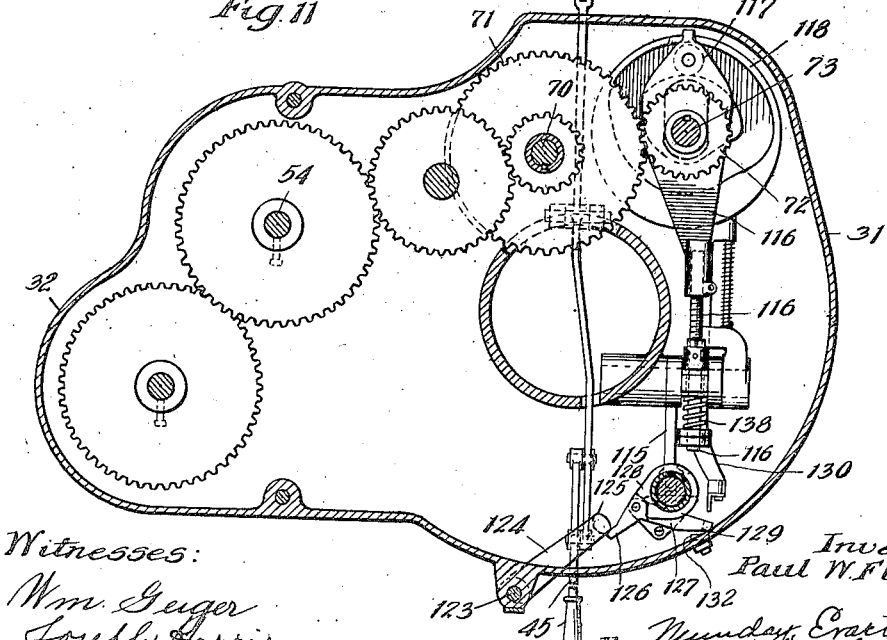

P. W. FLEISCHER.
FILLED CAN CLOSING MACHINE.
APPLICATION FILED NOV. 28, 1913.
1,406,631. Patented Feb. 14, 1922.
9 SHEETS—SHEET 8.
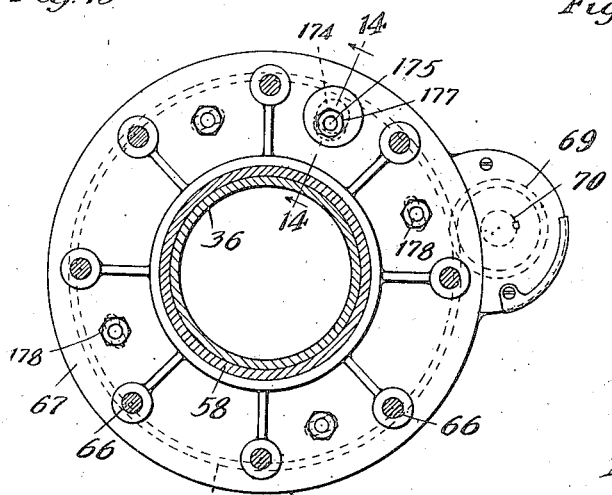
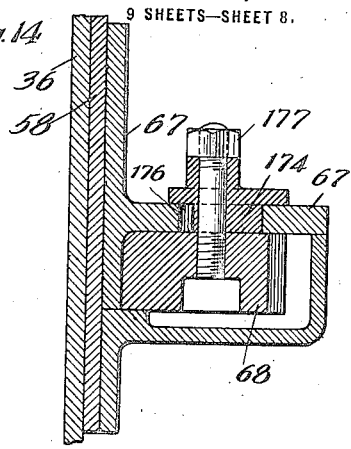
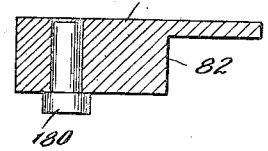
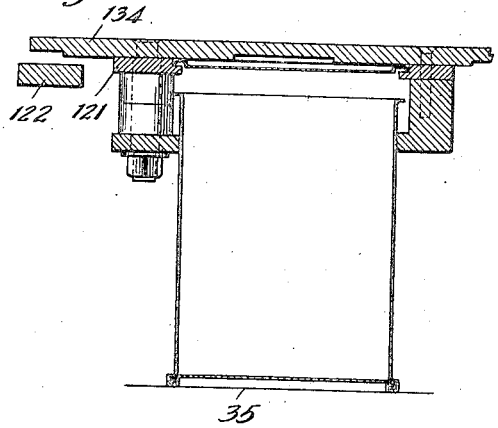
Witnesses:
Wm. Geiger
Joseph Harris
Inventor:
Paul W. Fleischer
By Munday, Evarts, Adcock & Clarke
his Attys.

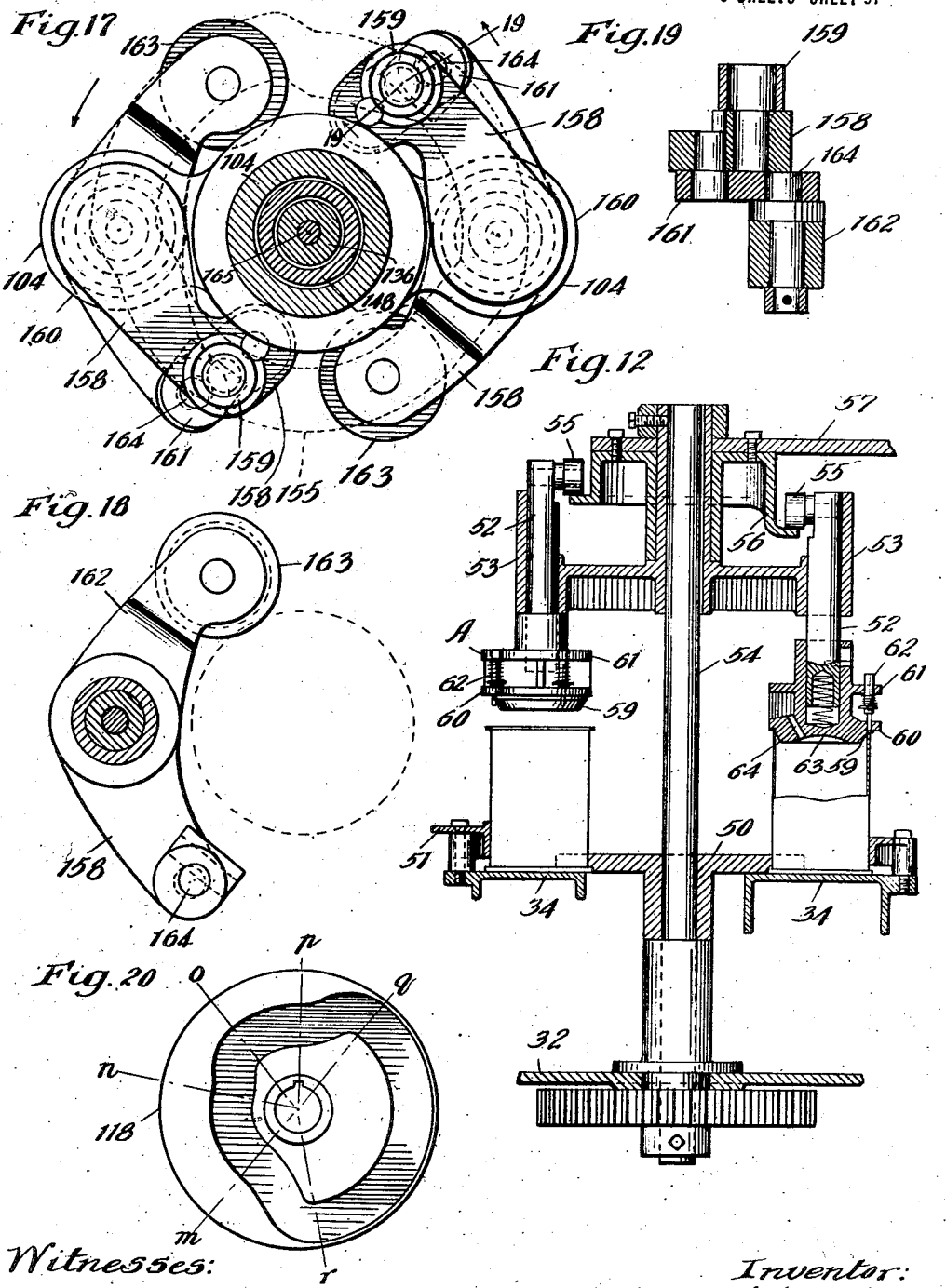

UNITED STATES PATENT OFFICE.

PAUL W. FLEISCHER, OF WEST HOBOKEN, NEW JERSEY, ASSIGNOR TO AMERICAN CAN COMPANY, OF WEST HOBOKEN, NEW JERSEY, A CORPORATION OF NEW JERSEY.

FILLED-CAN-CLOSING MACHINE.

1,406,631.                Specification of Letters Patent.   Patented Feb. 14, 1922.

Application filed November 28, 1913. Serial No. 803,406.

*To all whom it may concern:*

Be it known that I, PAUL W. FLEISCHER, a citizen of the United States, residing in West Hoboken, in the county of Hudson and State of New Jersey, have invented a new and useful Improvement in Filled-Can-Closing Machines, of which the following is a specification.

This invention relates to improvements in filled can closing machines.

One object of the invention is to provide a machine for automatically applying closures to filled cans and seaming the same at high speed without spilling any of the cans' contents.

Another object of the invention is to provide a machine of the type indicated, in which the closures are seamed to the can bodies at a relatively stationary seaming mechanism, the bodies and ends being fed to the seaming mechanism by a constantly, continuously moving feeding device having parts thereon so arranged that the can bodies and ends are given a period of rest of sufficient duration to allow of the seaming operation to take place, after which the then seamed cans are removed from the seaming mechanism and ejected from the machine.

Another object of the invention is to provide a feeder or propelling device for advancing the filled cans and loose can ends to the seaming mechanism, so arranged that the filled cans are advanced and stopped with an easy motion, thereby preventing spilling of the contents.

A further object of the invention is to provide means, automatically operated, which will prevent a can body from being seamed to the upper chuck of the seaming mechanism when no can end is placed on top of the can.

Other and further objects of the invention are to provide a filled can closing machine in which the closures or ends are applied to the filled cans while the latter are moving forwardly just prior to being brought to rest between the seaming chucks, and also while the can body is being raised upwardly to clamping position against the upper seaming chuck; in which topping devices are provided for engaging the contents of the filled cans and truing the can flanges prior to the fitting of the closures thereto; in which the can bodies are trued to their proper shape during the application of the closures thereto, the truing means also serving to properly aline the can bodies and closures with each other and with the seaming chucks; in which a simplified means of adjustment is provided for changing the machine to operate on cans of different heights; in which means are provided for adjusting and interchanging various parts to adapt the machine for operating on cans of different diameter; and in which is employed an improved seaming mechanism adaptable for operation on cans of different diameter and having means for minutely adjusting the parts thereof.

The invention furthermore consists in the improvements in the parts and devices and in the novel combinations of the parts and devices as herein shown, described or claimed.

In the drawing forming a part of this specification, is illustrated one form of machine embodying my improvements and a detailed description of which is given hereinafter, and the general operation of which is as follows: The filled cans are conveyed to the machine by a rotary table, the cans being properly spaced and timed as the same are fed beneath one of a series of topping devices which are mounted on a continuously rotatable turret or carrier, the topping devices operating while the filled cans are moving to true the flanges and press down and gage the contents of the cans; the filled cans as they come from the topping devices are then engaged by a feeder having a plurality of pivotally mounted propelling arms thereon which engage the cans and advance the same along a circular track to a position in alinement with relatively stationary seaming mechanism, the propelling arms being governed by a cam in such a way that the cans are given a period of rest while in alinement with the seaming mechanism; during the passage of the filled cans from the topping devices to the seaming mechanism, they pass beneath a magazine holding a stack of can ends, from which the can ends or closures are separated from the bottom, one by one, by means automatically governed by the cans themselves and the ends, as separated, being advanced on a supporting track in alinement with the can bodies by the same arms as propel the cans; during the retardation of the bodies and ends just prior to being clamped between the chucks of the seaming mechanism, the can bodies are raised and pressed against the ends with a yielding pressure, thereby assembling the ends on the can bodies, which assembling is completed by the time the articles are brought to a full stop, after which the assembled bodies and ends are raised still further, until firmly clamped between two chucks of the seaming mechanism, the bodies and ends being clamped and properly alined during the last step of the upward movement of the lower lifting chuck by means of a pair of oscillatable truing jaws or clamps; after the articles are properly clamped between the chucks, the rolls of the seaming mechanism engage with the seam-forming flanges of the assembled bodies and ends and the parts are then seamed together and after the completion of the seaming operation the seamed cans are again engaged by the propelling arms and removed from the machine. In the event that no can end is fed from the stack when a can body passes beneath the magazine, the lower chuck will be automatically prevented from lifting, thus preventing seaming of the can body to the upper chuck of the seaming mechanism.

Figure 2:
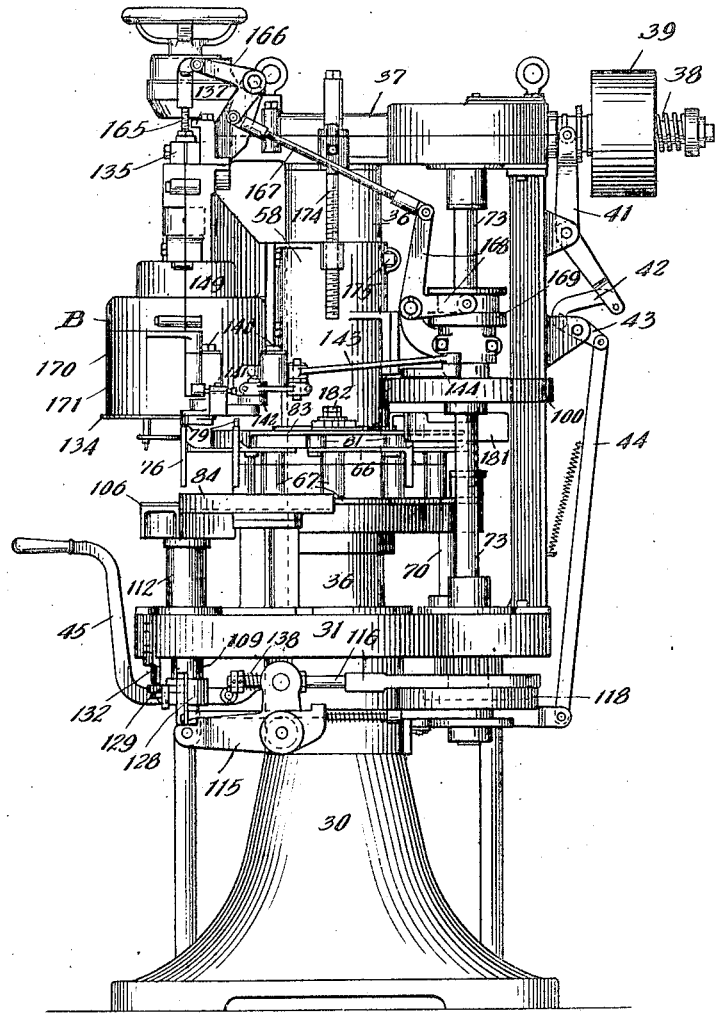

In said drawing, Fig. 1 is a front elevation of a machine embodying my improvements: Fig. 2 is a side elevation of the structure illustrated in Fig. 1, and looking from the right of the machine, as viewed in said Fig. 1; Fig. 3 is a top plan view of the machine; Fig. 4 is a horizontal sectional view taken substantially on the line 4—4 of Fig. 1; Fig. 5 is a vertical, sectional view, on an enlarged scale, taken substantially on the line 5—5 of Fig. 3; Fig. 6 is a vertical, sectional view, on an enlarged scale, taken on the line 6—6 of Fig. 3; Fig. 7 is a horizontal, sectional view taken on the line 7—7 of Fig. 1 and being upon a somewhat enlarged scale; Fig. 8 is a horizontal section taken on the line 8—8 of Fig. 5; Fig. 9 is a detail section taken on the line 9—9 of Fig. 8; Figs. 10 and 11 are horizontal, sectional views taken, respectively, on the lines 10—10 and 11—11 of Fig. 1; Fig. 12 is an enlarged, vertical, sectional view showing more particularly the topping devices and taken substantially on the line 12—12 of Fig. 3; Fig. 13 is a detail, horizontal, sectional view taken substantially on the line 13—13 of Fig. 6; Fig. 14 is an enlarged vertical, detail section taken on the line 14—14 of Fig. 13; Fig. 15 is a detail, sectional view of a portion of the cam governing the arms on the feeding devices; Fig. 16 is a detail, vertical, sectional view taken substantially on the line 16—16 of Fig. 7 and illustrating more particularly the guiding members for the can bodies and ends; Fig. 17 is a detail, sectional view of the seaming head taken substantially on the line 17—17 of Fig. 5; this figure also shows by dotted lines the contour of the operating cam which operates and controls the movement of the seaming rolls in timed relation with the rotation of the seaming head and with the movement of the cans and covers to and away from the seaming position. Fig 18 is a detail view of one of the seaming roll carrier levers; Fig. 19 is a detail, sectional view taken substantially on the line 19—19 of Fig. 17; Fig. 20 is a detail view of the cam controlling the movements of the lower chuck of the seaming mechanism; Fig. 21 is a detail, sectional view illustrating the latch for locking the plunger and sleeve of the lower chuck of the seaming mechanism; and Fig. 22 is an enlarged detail of the latching devices for locking the plunger and sleeve of the lower reciprocating chuck.

As shown in the drawing, the various mechanisms are supported on a suitable base or standard 30, the latter being provided with a main bed-plate 31 and an offset auxiliary bed-plate 32, said bed-plates supporting a rotatable table 33 and stationary tables 34 and 35 over which the cans are fed to the various operating devices. Extending upwardly from the center of the table 35 is a vertical, cylindrical standard 36, to the top of which is secured a horizontal bracket 37 having suitable bearings therein in which is rotatably mounted a drive shaft 38 driven from any suitable source of power (not shown) through pulley 39 having a clutch face with which co-operates a friction clutch disk 40, the latter being operated by a forked lever 41, link 42, lever 43, link 44 and hand lever 45, these parts being shown most clearly in Fig. 6. The open top, filled cans are first placed by hand or otherwise on the rotary table 33, the cans being guided by a removable, detachable, arcuate guard 46, having yieldably mounted plates 47 on its inner face. As the cans are carried round by the table 33, they are properly spaced and timed by a disk 48 rotatable in unison with the table 33, the disk 48 having a plurality of equally spaced projections 49 on its periphery. When the cans crowd one upon the other while being fed by the table 33 the cans will be frictionally held by the yieldable members 47 and rotated thereabout by the projections 49 until a can fits in between two of said projections, thus insuring a uniform, timed delivery of the cans to the rotary star wheel 50 located above the table 34, the cans being properly guided and held in position while being moved by said star wheel by another detachable and removable arcuate guard 51.

While the cans are being rotated by the star wheel 50, the same are operated upon by the topping devices A, which are illustrated most clearly in Fig. 12. The topping devices A correspond in number to the number of pockets in said star wheel 50 and are alined therewith, each topping device A being yieldably and slidably mounted on the lower end of a reciprocating plunger 52, said plunger 52 being slidably mounted in a spider 53 secured to a rotatable shaft 54, said shaft 54 being the same as that to which the star wheel 50 is also secured. Each plunger 52, at its upper end, is provided with a roller 55 which engages a stationary cam track 56 secured to a bracket 57, the latter being fixed to a split sleeve 58 slidably and adjustably mounted on the standard 36, said sleeve being more particularly hereinafter described. Each topping device A comprises a die-shaped head having a tapered lower portion 59 adapted to enter the mouths of the cans, a flange 60 adapted to engage and true the can body seaming flanges and another flange 61 in which are slidably mounted a plurality of spring-controlled ejecting pins 62 spaced around the peripheries of the flanges 60 and 61 and adapted to disengage the cans from the topping devices when the latter are raised from the cans by the cam 56. The under-face of the portion 59 of each topping device is concave, as shown at 63, and one or more vent holes 64 are provided so that not only do the topping devices true up the can bodies and flanges but they serve the further function of uniformly gaging the contents of each can so as to thereby leave a uniform space in the top of the cans before the covers are applied and seamed thereto.

After the cans have been operated upon by the topping devices the same are transferred to a guideway 65 on the table 35 where the cans as they come one by one from the star wheel 50 are engaged by propelling arms or flights 66. By referring to Figs. 6 and 10, it will be seen that each arm or flight 66 is in the form of a bell crank pivotally mounted on a continuously and uniformly rotatable carrier member 67, the latter being rotatably mounted on the sleeve 58 and having a gear 68 on the under side thereof meshing with and driven by a pinion 69, the latter being secured to the upper end of a short, vertical shaft 70 having a gear 71 at the bottom thereof meshing with another gear 72 (see Fig. 11) fixed to the lower end of a vertical shaft 73 which, at its upper end, carries a worm gear 74 (see Fig. 3) driven by a worm 75 on the horizontal shaft 38. The outer end of each propelling arm or flight 66 is provided with a vertical member 76 adapted to engage the can bodies below the seaming flanges thereof, which member 76 at the top thereof is provided with a pin 79 offset from the can engaging portion 76 an amount equal to one-half the difference between the diameters of the can bodies and the can ends whereby as the can bodies and can ends are propelled in alinement with each other, as hereinafter described, the can ends will be properly positioned relatively to the bodies. Each propelling arm 66 is provided with a short lever arm 80 having an antifriction roller 81 thereon, said rollers 81 traveling in a relatively stationary cam groove 82 formed on the under side of a cam plate 83 mounted on the sleeve 58. The cam groove 82 is so arranged that the propelling arms 66 are oscillated while bodily traveling with the carrier 67, thus causing the body and end engaging portions of the arms 66 to travel at speeds both greater than and less than that of the member 67 which carries them. As viewed in Fig. 10, it will be seen that as the rollers on the inner ends of the arms 66 traverse that portion of the cam groove 82 between the points $a$ and $b$, the outer ends of the arms 66 will be advanced or accelerated relatively to the carrier 67 and as the rollers traverse that portion of the cam groove between the points $b$ and $c$ the outer ends of the arms 66 will be swung backwardly or retarded relatively to the carrier 67, the rate of backward movement of the outer ends of the arms being equal to or greater than the rate of forward movement of the carrier 67, so that the bodies and ends which are propelled by the arms 66 will be allowed a period of rest at the seaming station, hereinafter described. As the rollers on the arms 66 traverse that portion of the groove 82 between the points $c$ and $d$, the outer ends of the arms will again be accelerated or advanced relatively to the carrier 67 to thereby engage the cans after the seaming has taken place and eject the finished cans out of the machine along the chute 84. The rise in the cam groove 82 from the point $a$ to the point $b$ is very gradual, thereby preventing any spilling of the can contents during the passage from the topping devices to the seaming mechanism, and the slowing down and stopping of the cans beneath the seaming mechanism is also accomplished by a gradual motion which helps to prevent spilling, so that by this arrangement I am enabled to feed the cans forwardly at a relatively high rate of speed, and still stop them completely, a sufficient length of time to permit of the seaming operation without danger of spilling, and in practice I have succeeded in feeding cans filled to within a quarter of an inch from the top, at a rate of over seventy per minute.

So far as I am aware, in other closing machines where the filled cans are brought to rest during the seaming operation, the highest practical speed obtainable at which the filled cans can be fed without spilling, has been limited to approximately forty per minute.

During the passage of the filled cans from the topping devices to the relatively stationary seaming mechanism B, and while the cans are moving, the ends or closures are fed and applied by the following devices: The ends are stacked in a magazine 85, detachably mounted on a bracket 86, secured to the sleeve 58 and movable therewith. By referring to Figs. 7, 8 and 9 it will be seen that there is slidably mounted in the bottom of the magazine 85 a cut-out knife 87 which reciprocates in suitable guideways 88 on the bracket 86. When no can bodies are being fed beneath the magazine, which is located above the guide 65, the knife 87 remains stationary, but when a can is being fed it operates. Its operation is controlled by a can-controlled lever 89 (see Fig. 10) fixed to an oscillatable, vertical rod 90 (see Fig. 5) to the upper end of which is fixed a lever 91 provided at its free end with a cam plate 92, the latter having a cam groove 93 in its under face in which operates a pin 94 mounted on one end of a latch 95 pivoted to the knife or slide 87. The other end of the latch 95 is provided with a hook 96 which co-operates with a shoulder 97 on a link 98, the latter being constantly reciprocated by a bell crank lever 99 operated by a cam 100 secured to the vertical shaft 73. When the controlling lever 89 is pushed out by a passing can, the cam plate 92 will be moved from its normal position, shown in Fig. 7, thereby in turn oscillating the latch 95 so that the hook thereon will engage the shoulder 97 whereupon the knife slide 87 will be reciprocated with the link 98. The pin 94, after the hook 96 has engaged the shoulder 97, in traversing the cam groove 93 on its outward stroke will push back the lever 91 to its normal position so that on the return stroke of the link 98 (with knife 87 and latch 95) the pin 94 will traverse the cam slot 93 in a reverse direction thereby disengaging the hook 96. Ordinarily, when the hook 96 is disengaged, the reciprocation of the link 98 will not affect the knife 87, since the link 98 is provided with a pin 101 which reciprocates freely in a slot 102 in the knife slide 87. As will be understood, the knife 87 when in its innermost position, supports the stack of can ends in the magazine 85 but when withdrawn from the magazine the stack will fall until supported by the can end supporting ledges 103 and upon the return of the knife within the magazine, the lowermost or bottom can end will be separated and cut out from the remainder of the stack. As a propelling arm 66 advances, the pin on the top thereof will engage the cut-out can end and move it along the ledges 103 in alinement with the can body. From the preceding description it will be seen that the feeding of the can ends is governed by the can bodies themselves, so that when no can body is present no end will be inadvertently fed.

As will be understood, the can body guides 65 and can end supporting ledges 103 extend to points adjacent the seaming mechanism B and the bodies and ends are brought to rest when in alinement therewith, due to the retardation of the propelling arms as hereinbefore described. The seaming mechanism, shown clearly in Fig. 5, comprises a head 104, upper non-rotatable chuck 105 and a lower, vertically reciprocating, non-rotatable chuck or lifter 106, the latter being yieldingly mounted by interposed springs 107 on a short plunger 108, the latter in turn being yieldably and slidably mounted within a sleeve 109, by spring 208, the amount of relative movement between the plunger 108 and sleeve 109 being limited by a pin 110 and slot 111. The sleeve 109 slides in a fixed bearing 112, said sleeve 109 having reciprocatingly mounted therein a plunger 113 which is adapted to be locked with said sleeve 109 by means hereinafter described. The plunger 113 is constantly reciprocated by a mechanism comprising a link 114 pivoted thereto, bell crank 115, rod 116, the latter having a roller 117 engaging in a cam 118 fixed to the shaft 73 (see Fig. 11). The plunger 113 is normally free to move up and down within the sleeve 109 by means of the pin and slot arrangement 119, 120. Means, however, are provided for locking the sleeve 109 and plunger 113, which is controlled by the can ends, so that when a can end is fed in alinement with a can body to be seamed thereto, the lower chuck 106 of the seaming mechanism will be reciprocated, but when no can end is present the chuck 106 will not be reciprocated, thereby preventing the possibility of the can body being seamed to the upper chuck 105 of the seamer. Said means comprises a pivotally mounted lever 121 (see Fig. 7) which forms a part of one of the can end supporting ledges, said lever 121, in normal position, occupying a position such that the distance between it and the co-operating opposite can end supporting ledge is less than the diameter of the can end being fed thereover. Hence, as the can end is fed along said member 121, the latter will be pushed out, which in turn operates a lever 122 fixed to the upper end of a shaft 123 to the lower end of which is fixed a lever 124. Said lever 124 is provided with a depending projection 125 which engages an end 126 of a latch or lock 127 pivotally mounted on a bracket 128 fixed to the sleeve 109. The other arm 129 of the latch 127 operates in slots in the plunger 113 and the sleeve 109 (see Fig. 22) so that when the latch 127 is moved to the position shown in said Fig. 22 the sleeve and plunger are locked, whereupon the sleeve and in turn the chuck 106 carried thereby, is moved in unison with the plunger 113. The latch 127, after the seaming operation is performed on the particular can body and can end which cause the latch to be operated, is positively knocked out or released by a reciprocating knockout rod 130 (see Fig. 21) said rod being operated by a cam 131 carried by shaft 73. To prevent the latch 127 from being accidentally displaced after it locks the plunger and sleeve, a depending guard 132 is fixed to the under side of the bed-plate 31, as shown in Fig. 2. As will be apparent, the knockout rod 130 will not only release the latch 127 but the movement of the latter will in turn cause the return of the pivoted portion of the can end supporting ledge 121 to its normal position, which is limited by a pin and slot arrangement 133 (see Fig. 7).

Referring now to Fig. 20, it will be seen that the cam 118 is constructed with a dwell between the radii m and n, a gradual rise between the radii n and o, a short dwell between the radii o and p, another gradual rise between the radii p and q, a long dwell between the radii q and r and a fall between the radii r and m. The cam is constructed as above described in order to raise the lower lifting chuck 106 of the seaming mechanism in two steps; that is by first raising the lower chuck a small distance, then holding the same stationary for a short period of time and subsequently completing the lifting movement and holding the chuck stationary in its highest position during the seaming operation, after which the chuck is lowered and the cycle of movements repeated whenever and as often as the latch 126 is operated. The operation of cam groove 82 and cam 118 is so timed that when the can bodies are first brought on to the lower lifting chuck 106 and before the cans are in axial alinement with the seaming mechanism, said chuck will be raised its first step by the cam 118 as hereinbefore described. This, on account of the spring 208, will serve to yieldingly press the can body up against its alined cover which is supported above it on the can end supporting ledges, thereby covering the can and preventing spilling of its contents, the can end in turn being pressed up against the bottom plate 134 of the seaming head, (see Fig. 5), and as the can body and end are being advanced still further over the chuck 106 to axial alinement with the upper and lower chucks, at the same time being gradually brought to a stop, due to the travel of the roller on the arm 66 in the cam groove 82, the cover will be pressed into place on the top of the can body, thereby completely assembling the can body and end substantially simultaneously with the same being brought to a full stop in axial alinement with the chucks. Upon the assembled body and end being brought to a full stop, the lower chuck 106 is raised still further, the can body and end being then pressed up against the upper chuck 105 of the seaming mechanism, the latter being raised by the continued upward movement of the lower chuck until the adjustable split nut 135 on the upper end of the chuck spindle 136 engages a stationary stop 137, the can body and end being then firmly clamped between the chucks and ready to be operated upon by the seaming rollers, it being understood that any small differences in height of the cans are compensated for by a spring 138 interposed between the rod 116 and the bell crank 115, (see Fig. 2), which is stronger than the spring 208, the latter being utilized only during the first upward movement of the chuck 106 to yieldingly press the can bodies and ends together, and being entirely compressed when the assembled bodies and ends are finally clamped between the upper and lower chucks.

After the bodies and ends have been assembled and brought to a stop as above described and practically simultaneously with the beginning of the last portion of the upward movement of the lower chuck, the can ends and bodies are centered and trued by a pair of pivoted segmental truing jaws 139, the latter being pivoted as at 140 and adjustably pivotally connected together by an eccentric stud 141 and link 142, the jaws 139 being oscillated simultaneously by a link 143 and bell crank 144, the latter engaging in a cam groove 145 formed on the cam member 100. The main or body portions of the segmental truing jaws 139 engage the can bodies, the can ends being engaged by three upstanding segmental lips 146 thereon arranged in the circumference of a circle. The foregoing described sequence of operations occurs in a very small interval of time, so that when the machine is running, the various operations appear to take place almost simultaneously but by proper timing of the parts the operations can be performed without spilling of any of the cans' contents.

The seaming mechanism which operates on the assembled can bodies and ends after the latter are pushed up through the opening 147 in the plate 134 and firmly clamped between the upper and lower chucks, comprises the head 104 rotatably mounted on and supported by a hollow sleeve 148 within which is mounted said spindle 136. The sleeve 148, which is flanged at the lower end thereof and provided with suitable ball-bearings for the head, is carried by, and adjustably supported in, a bracket 149, the latter being formed integral with the sleeve 58. The head 104 is rotated by a gear 150 secured thereto, the latter being driven by gear 151 fixed to a short vertical shaft 152 driven by bevel gears 153 and 154, the latter being fixed to the inner end of shaft 38 (see Fig. 6). Mounted on the head 104 and rotatable thereon, is a seaming roll lever-governing cam 155 rotated at a slightly slower speed than that of the head by gears 156 and 157, the latter being also rotatable with said shaft 152. In practice, the gears 150 and 151 will have forty-eight and fifty teeth respectively, and the gears 156 and 157 will have forty-nine teeth each, so that the cam 155 will lose one complete revolution during each twenty-five complete revolutions of the head 104, thereby oscillating the seaming roll operating-levers 158, each of which carries a roller 159 traveling in the cam 155, said seaming roll operating-levers 158 being pivotally mounted in offset extensions 160 on the head 104. Pivotally connected with each lever 158 is a link 161, the opposite end of which is pivotally connected to one end of a seaming roll carrying-lever 162, the latter being pivoted in an extension 160, as shown in Figs. 5 and 19, and carrying a seaming roll 163. The links 161 between the operating-levers and the carrying-levers are made removable and interchangeable for others of different length to adapt the seaming mechanism for operation on different diameter cans, and the connections between the links and levers are also made adjustable by means of eccentric pivot pins 164, (see Fig. 19), this latter adjustment being for the purpose of compensating for minute variations incident to wear on the parts, etc., as contradistinguished from the adjustment provided for by the interchangeable links 161 for operating on different size cans. After the seaming operation has been performed, the lower chuck 106 will be lowered, the upper chuck 105 falling in unison therewith and the cans will be prevented from sticking to said upper chuck by an ejector rod 165 operated by a bell crank lever 166, rod 167 and bell crank lever 168, the latter having a roller engaging in a cam 169 mounted on the shaft 73. While both of the cam rollers 159 are in what may be called the low part of the cam groove, relatively near to the center of rotation, the can and cover will be lifted against the upper chuck, and then the first operation cam roller travels over the first operation cam face. As soon as the first operation is finished and the first operation seaming roller disengages from the can the second operation cam roller is moved away from the center of rotation by the second operation cam face and the second operation seaming roller begins its work. In Fig. 17 the second operation seaming roller shown at the lower right hand side of said figure is just being released from the seam, and this inactivity of both seaming rollers permits the seamed can to be lowered and moved from the seaming station and a new unseamed can to be fed onto the can lifter and raised. During these can feeding movements (after the first-seamed can has been lowered out of range of the seaming rollers) the second operation cam roller travels over the first operation cam face and the first operation roller will travel over the second cam face, and then the seaming mechanism will be in position to begin the first operation seaming on the newly chucked can. After the cans are released from the seaming mechanism they are engaged by the propelling arms 66 and ejected from the machine through the chute 84, as previously described. For safety, the seaming head and co-operating parts are enclosed in a suitable case 170, the latter being provided with a hinged section 171 adapted to be locked in closed position by a latch 172.

Referring now to Figs. 2 and 6, it will be seen that the sleeve 58 is split, as indicated at 173, so that the sleeve may be adjusted up and down on the standard 36 by the adjusting bolt 174, the sleeve 58 being clamped in position by a clamping bolt 175 which passes through offset projections on the split portions thereof. As has been previously described, the topping devices, can end separating and feeding devices, the can body and can end propelling devices and the seaming head with its adjacent parts, are all directly carried and supported by said sleeve 58 so that any adjustment of the latter adjusts all the above described operating mechanism simultaneously and at the same time maintains their relative vertical position, so that the machine can be quickly adapted for operating on cans of different heights. As will be understood, the various shafts, rods, cams and gears referenced 54, 70, 73, 90, 100, 123, 153 and 169 are provided with keys, feathers or set-screws whereby they may all be adjusted vertically when the machine is changed to operate on cans of different height.

The machine is also made adjustable for operation on cans of different diameter and to this end the cam disk or plate 83 is adjustable angularly relatively to the sleeve 58 by means of an eccentric stud 182 (see Fig. 10), said stud being mounted in an extension on the sleeve 58. By adjusting the cam groove 82 which controls the movements of the propelling arms 66, the points at which the cans are accelerated, retarded and stopped can be varied in accordance with the diameters of the cans as desired, the essential feature being that the axes of the cans shall be in alinement with the chucks of the seaming mechanism when the cans are brought to rest therebetween. When the cam disk 83 is adjusted as just described, it becomes necessary to adjust the gear 68 relatively to the carrier 67 to which it is secured in order to preserve the proper timed relations between the movements of the propelling arms and the movements of the chuck or lifter 106. By referring to Figs. 13 and 14, it will be seen that the carrier 167 has mounted therein an eccentric stud 174' having a bolt 175' therethrough which is fixed to the gear 68, the eccentric stud working in a slot 176 in the carrier 67. As will be understood, by loosening the nut 177 and rotating the eccentric stud 174, the angular relation between the gear 68 and carrier 67 may be adjusted as desired. The gear 68 is held rigid with the carrier 67 after an adjustment has been made by a plurality of bolts and nuts 178 movable in elongated slots in the carrier 67, as shown more clearly in Fig. 13. Other means for adapting the machine to operate on different diameter cans are provided by making the guides 46 and 51 interchangeable for others of different size; by making the star wheel 50 and the topping devices interchangeable and removable for others of different size; by making the can body and can end guides interchangeable and removable for others of different width; by having the truing jaws interchangeable for others of different size; by making the can end magazine detachable and interchangeable; and by having the seaming mechanism adjustable for operation on cans of different diameter by providing interchangeable links 161 as previously described.

After the seamed cans have been pushed down the chute 84 by the propelling arms, it becomes necessary to place the propelling arms in such a position that they will clear the shaft 73, (see Fig. 10), and to accomplish this result, each propelling arm is provided with a forked portion 179 which strikes a fixed pin 180, (see Fig. 15), on the under side of the cam plate 83, which pin throws the propelling arms forward sufficiently to clear said shaft 73 and to prevent any accidental displacement of the propelling arms while passing the shaft 73, a guard 181 is provided.

I do not in this application claim broadly the topping mechanism for filled can closing machines or the feeding and spacing mechanism for filled can closing machines, the same being the subjects respectively of my applications Serial Nos. 528,027 and 528,028, filed January 9, 1922, said applications being divisions hereof.

I claim—

1. A can seaming machine including, in combination; a relatively stationary seaming mechanism having seaming rolls and upper and lower chucks; a feeder for propelling can bodies to said seaming mechanism; means, operable in unison with said feeder, for picking up a can end and moving it toward the seaming mechanism; guides on which the can ends are supported while being moved toward the seaming mechanism; and mechanism for lifting the lower chuck after a can has been placed thereon and while still moving, to thereby press the can body up against the can end, substantially as specified.

2. A seaming machine including, in combination: a supporting frame having a table thereon and an upwardly extending post; a head slidably mounted on said post; and a seaming head, a can end magazine, can end feeding and propelling means and a can body feeder all mounted on and supported by said slidable head and movable in unison therewith, whereby all said operating mechanisms may be simultaneously adjusted for cans of different heights by moving said slidable head and at the same time maintain the relation between said operating mechanisms, substantially as specified.

3. A seaming machine including, in combination: relatively stationary seaming mechanism to which cans are adapted to be brought; a continuously movable feeder having a plurality of can-propelling arms thereon and bodily movable therewith; and means for moving said arms relatively to the feeder during the movement of the latter, whereby portions of said propelling arms are accelerated and retarded, said means being adjustable to thereby vary the points at which the accelerating and retarding movements of said arms take place, substantially as specified.

4. A seaming machine including, in combination: relatively stationary seaming mechanism to which cans are brought; a continuously movable feeder having a plurality of can-propelling arms pivotally mounted thereon and bodily movable therewith; and an adjustable cam for controlling the movements of said pivoted arms, substantially as specified.

5. A seaming machine including, in combination: relatively stationary seaming mechanism to which cans are adapted to be brought for seaming; a continuously rotatable feeder having a plurality of can propelling arms pivotally mounted thereon and bodily movable therewith; and an adjustable cam for controlling the movements of said arms, substantially as specified.

6. A seaming machine including, in combination: a supporting frame having a table thereon and a post extending vertically upward therefrom; a head slidably mounted on said post; and a seaming head, a can end magazine, can body and can end feeding means, and centering jaws located beneath said seaming head, said head, magazine, feeding means and jaws being all mounted on and supported by said slidable head and movable in unison therewith, whereby all of said parts are simultaneously adjustable for cans of different heights by moving said slidable head, substantially as specified.

7. In a seaming machine, in combination: seaming mechanism; a continuously movable feeder having a plurality of can propelling arms independently movable thereon and bodily movable therewith; and means governing the independent movements of said arms while the feeder is moving, said means being adjustable to thereby vary the points at which said independent movements of the arms take place, substantially as specified.

8. In a seaming machine, in combination: seaming mechanism; a continuously rotatable feeder having a plurality of can propelling arms pivotally mounted thereon and bodily movable therewith; a stationary cam adapted to oscillate said arms as the latter rotate with the feeder to thereby accelerate and retard the movements of said arms; and means for adjusting said cam to thereby vary the points at which said accelerating and retarding movements of said arms take place, substantially as specified.

9. A seaming machine including, in combination: seaming mechanism; a holder for a stack of can ends; mechanism for propelling can bodies and ends to said seaming mechanism; devices for cutting out can ends one by one from the stack; and means, dependent upon the presence or absence of a can end, governing the chucking of the cans to be seamed and adapted to prevent a can body from being operated upon by the rolls of the seaming mechanism when no end is present, substantially as specified.

10. A seaming machine including, in combination: seaming mechanism having chucks relatively movable toward and from each other to clamp a can therebetween; mechanism for propelling can bodies to the seaming mechanism; means for feeding can ends to the bodies before the latter reach the seaming mechanism; and means for preventing said chucks from being moved toward each other to clamp a can when no end is fed to a body, substantially as specified.

11. A seaming machine including, in combination: seaming mechanism having seaming rolls, an upper chuck and a reciprocating lower chuck; mechanism for propelling can bodies to said seaming mechanism; devices for feeding can ends to the bodies prior to the bodies reaching the seaming mechanism; and means for preventing a reciprocating movement of said lower chuck when no can end is fed to a can body, substantially as specified.

12. A seaming machine including, in combination: seaming mechanism having chucks between which the cans are adapted to be clamped during the seaming operation; a holder for a stack of can ends; means for cutting out one can end at a time from the stack, said means being operated only when a can body is present to receive a can end; mechanism for propelling can bodies and ends in alignment with each other to said seaming mechanism; and means for preventing a can being chucked when no end is fed thereto, substantially as specified.

13. A seaming machine including, in combination: seaming mechanism; devices for feeding can bodies and can ends to said seaming mechanism to be operated upon thereby; and means for preventing the seaming operation from taking place when no can end accompanies the can body, substantially as specified.

14. A seaming machine including, in combination: seaming mechanism; a track along which can bodies are adapted to be propelled to said seaming mechanism; a track along which can ends are adapted to be propelled to the seaming mechanism; devices for propelling can bodies and can ends along said tracks in alignment with each other to said seaming mechanism; and means for preventing the seaming operation from taking place when no can end is fed in alignment with the can body, said means including a movably mounted member in the path of can ends being moved along the can end track and adapted to be operated by a can end, substantially as specified.

15. A seaming machine including, in combination: seaming mechanism having chucks relatively movable toward and from each other; operating mechanism adapted to move one of said chucks; devices for feeding can bodies and ends to said seaming mechanism; and means, operated by a can end, for operatively connecting said actuating mechanism with its chuck, whereby when no can end is present to be seamed with a body, the chucks of the seaming mechanism remain fully separated, substantially as specified.

16. A can seaming machine including, in combination: a can propelling member mounted upon a central axis and rotatable in a circular path around the same; seaming mechanism adjacent to said path; a central controlling member connected with the propelling member to give the same a variable movement; and power mechanism connected with said propelling member and with said seaming mechanism.

17. A can seaming machine including, in combination: a uniformly and continuously movable feeder having a plurality of pivotally mounted can propelling members thereon, said members being oscillatable relatively to the feeder during the movement of the latter to give the cans an easy movement and a period of rest; means whereby said propelling members are caused to move around a central point while engaged with a can; seaming mechanism adjacent the path of said propelling members at the point of rest to which the cans are propelled by said members; a cam for oscillating said members; and power mechanism connected with said feeder and with said seaming mechanism.

18. A can seaming machine including, in combination: relatively stationary seaming mechanism, the latter comprising seaming rolls and upper and lower non-rotatable chucks; a pair of pivotally mounted centering jaws adapted to center and true the cans when the latter are brought between said chucks; means for feeding can bodies and can ends in alinement with but separated from each other, to the seaming mechanism; and means, including an interposed cushioning element, for raising said lower chuck in steps to assemble the can bodies with the ends.

19. A can seaming machine including, in combination: a table; guides located above said table for supporting can ends; seaming mechanism, the latter including seaming rolls and upper and lower chucks; means for propelling can bodies and can ends separate from each other along said table and said guides respectively to the seaming mechanism; and a cam for raising said lower chuck in steps after the can bodies, separate from the can ends, are first brought thereon.

20. In a can seaming machine, in combination: a pair of non-rotatable chucks relatively movable axially to and from each other and adapted to clamp a can therebetween; and a rotatable seaming head having horizontal swinging roll carrier levers; horizontally swinging cam operated levers; links connecting the cam levers with the roll levers; and means for adjusting horizontally the pivots of said links.

21. A seaming machine including, in combination: relatively stationary seaming mechanism; a magazine for holding a stack of can ends; and a combined can body feeder and can end feeder, said combined feeder including a movable carrying member having a plurality of pivotally mounted arms thereon, the arms being bodily movable with the carrying member and also independently movable thereof, each arm having a portion thereof for engaging a can body and another portion offset from the first named portion to engage a can end and hold the latter in proper relation with the can body; and means for holding the can ends separated from the can bodies while they are so fed.

22. In a can closing machine, in combination: a can end stack holder and separator; a seaming mechanism; and a can body propelling arm having means for propelling the can ends parallel with and separate from the can bodies, and guides along which the can bodies and can ends are propelled while so separated.

23. In a machine for applying together can ends and can bodies, the combination of can end and body applying mechanism comprising a vertical shaft and a seaming head thereon, can feeding means comprising a horizontally movable carrier, can-engaging members movably mounted on said carrier, a curved can-guiding track in which said can-engaging members operate, a cam substantially parallel with said curved track, and having cam faces extending towards and from said track and controlling and operating said can engaging members with a variable can-advancing movement, and actuating mechanism connected with said seaming head and with said movable carrier.

24. In a machine for applying together can ends and can bodies, the combination of can end and body applying mechanism comprising a vertical shaft and a seaming head thereon and a can lifter, can feeding means comprising a horizontally movable carrier, can-engaging members movably mounted on said carrier, a curved can-guiding track in which said can-engaging members operate, a cam substantially parallel with said curved track and having cam faces extending towards and from said track and controlling and operating said can engaging members with a variable can-advancing movement, and actuating mechanism connected with said seaming head and with said movable carrier.

25. In a machine for applying together can ends and can bodies, the combination of can end and body applying mechanism comprising a vertical shaft and a seaming head thereon, can feeding means comprising a horizontal carrier rotary about a vertical axis, can-engaging members movably mounted on said carrier, a curved can-guiding track in which said can-engaging members operate, a cam substantially parallel with said curved track, extending around said axis of the carrier and having cam faces extending towards and from said track and controlling and operating said can engaging members with a variable can-advancing movement, and actuating mechanism connected with said seaming head and with said movable carrier.

26. In a machine for applying together can ends and can bodies, the combination of can end and body applying mechanism, can end feeding means, can body feeding means comprising a rotary carrier, a vertical pivotal bearing for said carrier, can engaging members having pivotal bearings on said carrier, a can guiding track extending part of the way around said pivotal bearing, and means for controlling and operating said can-engaging members to vary their can-propelling advance.

27. In a machine for applying together can ends and can bodies, the combination of can end and body applying mechanism, can end feeding means, can body feeding means comprising a can-propelling carrier having a vertical pivotal bearing, can engaging members movably mounted on said carrier, a can guiding track extending part of the way around said pivotal bearing, and a cam extending around said pivotal bearing and having faces for controlling and operating said can-engaging members to vary their can-propelling advance.

28. In a machine for applying together can ends and can bodies, the combination of can end and body applying mechanism, can end feeding means, can body feeding means comprising a rotary carrier, a vertical pivotal bearing for said carrier, can-engaging members having pivotal bearings on said carrier, a can guiding track, and a cam extending around said pivotal bearing and having faces for controlling and operating said can-engaging members to vary their can-propelling advance.

29. In a machine for applying together can ends and can bodies, the combination of can end and body applying mechanism, can end feeding means, can body feeding means comprising a rotary carrier, a vertical pivotal bearing for said carrier, can engaging members having pivotal bearings on said carrier, a can guiding track extending part of the way around said pivotal bearing, and a cam extending around said pivotal bearing and having faces for controlling and operating said can-engaging members to vary their can-propelling advance.

30. In a machine for applying together can ends and can bodies, the combination of can end and body applying mechanism, can end feeding means, can body feeding means comprising a rotary carrier, a vertical pivotal bearing for said carrier, can engaging members having pivotal bearings on said carrier and moved thereby in a circular path, a can guiding track extending part of the way around said pivotal bearing, and a cam extending around said pivotal bearing and having faces for controlling and operating said can-engaging members to vary their can-propelling advance.

31. An apparatus for uniting flanged and shouldered can ends to flanged cans, comprising rotary mechanism carrying rotary seaming means, devices for moving flanged cans and flanged and shouldered can ends in unison along a path leading to said rotary seaming means while separated from each other, means for bringing said cans and can ends together into complete assembled relation while said cans are moving and before reaching said rotary seaming means and for continuing the movement of said flanged cans and said can ends as assembled units into operative relation with said rotary seaming mechanism where they are permanently united, and means arranged along the path traversed by said flanged cans and moved by said cans for controlling the feed of said can ends.

32. In a can seaming and closing machine, in combination: a seaming mechanism; a continuously moving can-carrier arranged to deliver cans under and to convey them away from the said seaming mechanism; and provided with means for holding the cans in spaced arrangement; and a reciprocating can-feeding means co-operating transversely with the said can carrier to transfer cans from said carrier to the seaming mechanism and from said seaming mechanism to the carrier.

33. In a can seaming and closing machine, in combination; a seaming mechanism; a continuously moving can-carrier arranged to deliver cans in line with and to convey them away from the said seaming mechanism; and provided with means for holding the cans in spaced arrangement; and a reciprocating plunger cooperating with the said can carrier to transfer cans from said carrier to the seaming mechanism and from said seaming mechanism to the carrier.

34. In a can seaming and closing machine, in combination; a rotary can end seaming head; a continuously moving can-carrier arranged to deliver cans in line with and to convey them away from the said seaming mechanism; and provided with means for holding the cans in spaced arrangement; and a reciprocating plunger co-operating with the said can carrier to transfer cans from said carrier to the said seaming head and from said seaming head to the carrier.

35. In a can seaming and closing machine, in combination: a seaming mechanism; an upper can holding chuck; a continuously moving can-carrier arranged to deliver cans under and to convey them away from the said seaming mechanism; and provided with means for holding the cans in spaced arrangement; and a lower reciprocating plunger or chuck cooperating with the said can carrier to transfer cans from said carrier to the said upper chuck and seaming mechanism and from said seaming mechanism to the carrier.

36. In a can seaming and closing machine, in combination; seaming mechanism; can-end feeding mechanism; a continuously movable can-carrier arranged to deliver cans under and to convey them away from the said seaming mechanism; and provided with means for holding the cans in spaced arrangement; and a reciprocating can-feeding means cooperating transversely with the said carrier to transfer cans from said carrier to the seaming mechanism and from said seaming mechanism to the carrier.

37. The combination of a continuously moving conveyer having means for holding cans in spaced arrangement and adapted to convey cans in a given direction; can end attaching means; and upwardly moving mechanism acting to remove cans successively from said conveyer into operative relation with the can end attaching means and to return them in a reverse direction and by the same path to said conveyer.

38. In a machine for attaching can ends to can bodies, the combination of can end attaching means, a continuously moving can carrier having means for holding cans in definite spaced arrangement, devices for transferring the cans from said carrier to said attaching means, and actuating mechanism whereby the said carrier and transferring devices are operated in timed relation to each other to disengage the cans from said holding means at a station and transfer them into operative relation with the said attaching means, said carrier being arranged to re-engage the cans, after the attachment of their ends, at the same station where they were so disengaged.

39. In a can seaming and closing machine, in combination, a seaming mechanism, can end feeding mechanism, a continuously moving can carrier arranged to deliver cans in line with and to convey them away from the said seaming mechanism and provided with means for holding the cans in spaced arrangement, a reciprocating plunger cooperating with the said can carrier to transfer cans from said carrier to the seaming mechanism and from said seaming mechanism to the carrier, and means cooperating with the said can carrier, actuated by the continuously moving carrier through the media of the successive cans thereon and controlling the operation of the said can end feeding mechanism.

40. In a can seaming and closing machine, in combination, a seaming mechanism, a continuously moving can carrier arranged to deliver cans in line with and to convey them away from the said seaming mechanism, and provided with means for holding the cans in spaced arrangement, can end feeding mechanism, a reciprocating plunger, cooperating with the said can carrier to transfer cans from said carrier to the seaming mechanism and from said seaming mechanism to the carrier, and means cooperating with the said can carrier, actuated by the successive cans thereon and controlling the operation of the said can end feeding mechanism.

41. In a can seaming and closing machine, in combination, seaming mechanism, can-end feeding means, a continuously movable can-carrier arranged to cause the cans to operate mechanism of said can-end feeding means, and acting to deliver cans under and to convey them away from the said seaming mechanism and provided with means for holding the cans in spaced arrangement, and a reciprocating can-feeding means cooperating transversely with the said carrier to transfer cans from said carrier to the seaming mechanism and from said seaming mechanism to the carrier.

42. In a machine for securing can ends to can bodies, the combination of can body and can end feeding means, upper and lower chucks between which the assembled can and can end are clamped, can-seaming means comprising a first operation roll and a second operation roll independently movable relative to each other during the seaming operation, devices for pressing the first operation roll against the parts of the assembled can and can end which are to be seamed while the second operation roll is idle, devices for pressing the second operation roll against the partly formed seam, said devices including a single cam track co-axial with said can seaming means and formed with successive cam-portions for operating both of said rolls as described and with a portion which allows both of said rolls to be inoperative while the seamed can is removed and a succeeding unseamed can is fed to a position in line with the can-seaming means, and means for producing rapid relative rotation between the can on the one hand and said rolls and pressing devices on the other hand including means for producing slow relative rotation between said cam and said rolls around the axis of the can-seaming means.

43. In a machine for securing can ends to filled can bodies the combination of a seaming mechanism, a conveyor moving the filled can horizontally to the seaming mechanism, can-lifting means for lifting the can to said seaming mechanism, and movable operating devices for said can lifting means whereby the latter lifts said can by a plurality of separated lifting steps prior to the seaming operation.

44. In a machine for securing can ends to filled can bodies the combination of seaming mechanism, a conveyor moving filled cans horizontally to said seaming mechanism, a vertically movable can lift having a plurality of progressive upward steps, said conveyor moving the can body across said lifting mechanism between successive lifting steps of said lifting mechanism.

45. In a machine for securing can ends to filled can bodies the combination of a seaming mechanism, a conveyor for moving the filled cans horizontally, and a lifting mechanism having a plurality of progressive lifting steps, said conveyor moving the cans across said lifting mechanism during an early one of said lifting steps.

46. In a machine for securing can ends to filled can bodies the combination of seaming mechanism, means for lifting filled cans by a succession of progressive lifting steps, and means moving the cans horizontally across said lifting means during an early one of said lifting steps.

47. In a machine for securing can ends to filled can bodies the combination of a seaming mechanism, a conveyor moving the filled can horizontally to the seaming mechanism, can-lifting means for lifting the can to said seaming mechanism, and movable operating devices for said lifting means whereby the latter lifts said can by a plurality of separated lifting steps, a prior step bringing the can in contact with the under side of the cover and the next step lifting the cover with the can.

48. In a machine for securing can ends to can bodies, the combination of can-seaming mechanism, an endless carrier having devices for feeding can bodies thereto, a stack holder for superposed can ends, and means for controlling the escape of can ends from said stack holder, said can body feeding devices each carrying therewith means for removing can ends successively from said stack holder.

49. An apparatus for uniting flanged and shouldered can ends to flanged cans, comprising rotary mechanism carrying rotary seaming means, devices for moving flanged cans and flanged and shouldered can ends in unison along a path leading to said rotary seaming means while separated from each other, means for bringing said cans and can ends together into complete assembled relation while said cans are so moving in unison and before reaching said rotary seaming means and for continuing the movement of said flanged cans and said can ends as assembled units into operative relation with said rotary seaming mechanism where they are permanently united, and means controlled by the can body for preventing the clogging of the machine by a can end when a can body is not fed in time to the seaming mechanism.

PAUL W. FLEISCHER.

Witnesses:
C. W. GRAHAM,
W. D. FOSTER.